(12) United States Patent
Makiyama

(10) Patent No.: US 7,955,216 B2
(45) Date of Patent: Jun. 7, 2011

(54) AUTOMATIC TRANSMISSION SHIFT CONTROL APPARATUS

(75) Inventor: Akihiro Makiyama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 908 days.

(21) Appl. No.: 11/870,696

(22) Filed: Oct. 11, 2007

(65) Prior Publication Data

US 2008/0254937 A1    Oct. 16, 2008

(30) Foreign Application Priority Data

Nov. 22, 2006  (JP) .................. 2006-315575
Sep. 5, 2007   (JP) .................. 2007-230326

(51) Int. Cl.
*F16H 61/662*   (2006.01)
*F16H 61/00*    (2006.01)
(52) U.S. Cl. .................. 477/47; 477/119
(58) Field of Classification Search .......... None
See application file for complete search history.

(56) References Cited

U.S. PATENT DOCUMENTS
7,011,602 B2 *   3/2006   Makiyama et al. ............ 477/44

FOREIGN PATENT DOCUMENTS
JP      H09-112680      5/1997

* cited by examiner

*Primary Examiner* — Dirk Wright
(74) *Attorney, Agent, or Firm* — Global IP Counselors, LLP

(57) ABSTRACT

An automatic transmission shift control apparatus is basically provided with deceleration operating condition detecting section, a first shift phase control section and a second shift phase control section. The deceleration operating condition detecting section detects a vehicle coasting condition. The first shift phase control section control a gear ratio of an automatic transmission installed in a vehicle using a first shift phase control after detecting the vehicle coasting condition has started such that a deceleration rate of the vehicle enters a deceleration region. The second shift phase control section control the gear ratio of the automatic transmission after the first shift phase control ends such that the deceleration rate of the vehicle enters a constant speed region.

11 Claims, 9 Drawing Sheets

AUTOMATIC TRANSMISSION SHIFT CONTROL APPARATUS

CROSS-REFERENCE TO RELATED APPLICATIONS

This application claims priority to Japanese Patent Application No. 2006-315575, filed on Nov. 22, 2006 and Japanese Patent Application No. 2007-230326, filed on Sep. 5, 2007. The entire disclosure of Japanese Patent Application No. 2006-315575 and Japanese Patent Application No. 2007-230326 are hereby incorporated herein by reference.

BACKGROUND OF THE INVENTION

1. Field of the Invention

The present invention generally relates to a shift control that controls the shifting of an automatic transmission of a vehicle based on the vehicle speed and the accelerator position. More specifically, the present invention relates to a shift control for controlling the shifting of an automatic transmission when the vehicle is traveling in an inertia state (coasting).

2. Background Information

A shift control for a continuously variable transmission typically uses a conventional shift map to control the shifting of the transmission based on the accelerator position and a target input rotational speed of the transmission. When the vehicle is traveling down a declined surface, the accelerator position generally decreases and the gear ratio of the continuously variable transmission is shifted to a higher ratio. Thus, even if the accelerator position is substantially zero when the vehicle is traveling down a declined surface, the shift control acts to maintain the gear ratio at a higher value so that engine breaking does not occur.

In response to these conventional shift control technologies, a shift control has been proposed for controlling engine braking during coasting such that the vehicle decelerates in accordance with the vehicle speed, even if the vehicle speed is high, and the feeling of deceleration is expected by a driver. One example of this technology is disclosed in Japanese Laid-Open Patent Publication No. 9-112680.

In Japanese Laid-Open Patent Publication No. 9-112680, the shift control apparatus for a continuously variable transmission determines if the longitudinal acceleration of the vehicle exceeds a threshold value when the driver has released the accelerator and the accelerator position is substantially zero. The threshold value is varied in accordance with the vehicle speed. If it is determined that the longitudinal acceleration exceeds the threshold value, then the target input rotational speed of the continuously variable transmission is corrected to a larger value and shift control of the continuously variable transmission is executed such that the corrected target input rotational speed is achieved. With the technology of Japanese Laid-Open Patent Publication No. 9-112680, sufficient engine braking can be ensured even when the vehicle speed is in a high speed region, and thus, the feeling of deceleration that drivers expect can be obtained.

In view of the above, it will be apparent to those skilled in the art from this disclosure that there exists a need for an improved automatic transmission shift control apparatus. This invention addresses this need in the art as well as other needs, which will become apparent to those skilled in the art from this disclosure.

SUMMARY OF THE INVENTION

It has been discovered that in a continuously variable transmission shift control apparatus of the type disclosed in Japanese Laid-Open Patent Publication No. 9-112680 certain characteristics can be improved. Those characteristics will now be explained. Since the aforementioned threshold value is varied according to the vehicle speed, the same deceleration rate is obtained due to engine braking when the accelerator position becomes substantially 0 while the vehicle is traveling in either a low speed region or a high speed region in which, afterwards, the vehicle speed decreases to a low speed region.

Conversely, the deceleration rate expected by a driver during coasting is different at an initial stage of coasting than at an intermediate or late stage of coasting.

In short, with the technology disclosed in Japanese Laid-Open Patent Publication No. 9-112680, the feeling of deceleration expected by a driver can not be obtained throughout an entire period of coasting.

The object of the present invention is to provide an automatic transmission shift control that can achieve a deceleration rate expected by a driver both during an initial stage of coasting and during intermediate and late stages of coasting.

In order to achieve the aforementioned object, an automatic transmission shift control apparatus is provided that basically comprises deceleration operating condition detecting section, a first shift phase control section and a second shift phase control section. The deceleration operating condition detecting section detects a vehicle coasting condition. The first shift phase control section control a gear ratio of an automatic transmission installed in a vehicle using a first shift phase control after detecting the vehicle coasting condition has started such that a deceleration rate of the vehicle enters a deceleration region. The second shift phase control section control the gear ratio of the automatic transmission after the first shift phase control ends such that the deceleration rate of the vehicle enters a constant speed region.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
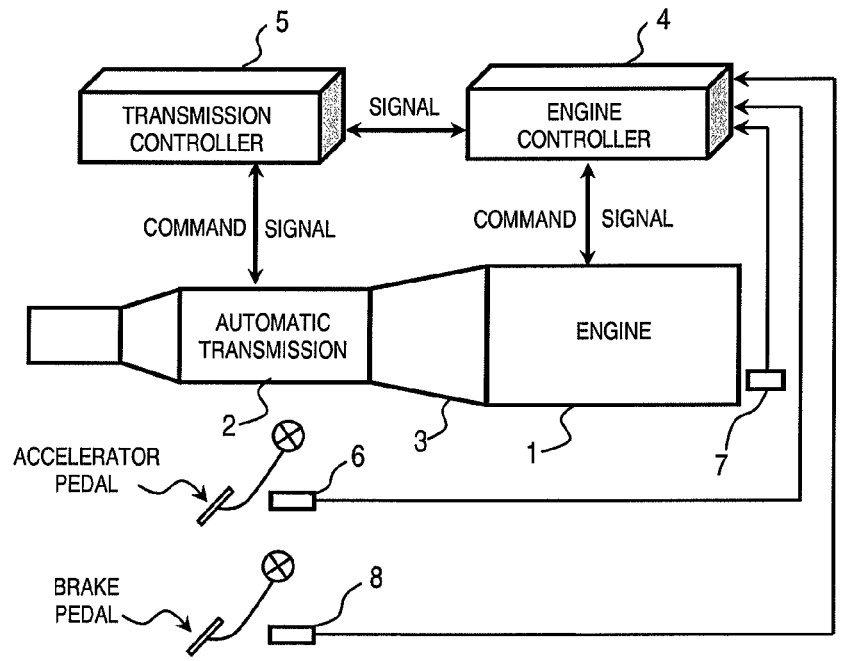
FIG. 1 is a simplified, schematic view of a power train of a vehicle equipped with an automatic transmission shift control apparatus in accordance with a first embodiment of the present invention.

Referring initially to FIG. 1, a power train is illustrated that is equipped with an automatic transmission shift control apparatus in accordance with a first embodiment of the present invention. The power train basically includes an engine 1, an automatic transmission 2 with a tandem connection between the engine 1 and the automatic transmission 2. The engine output is fed through a torque converter 3 and inputted to the automatic transmission 2. The output side of the automatic transmission 2 is connected to wheels of the vehicle in such a manner as to drive the wheels.

The output (rotational speed and torque) of the engine 1 is increased and decreased (adjusted) by controlling an opening degree of a throttle valve degree independently of the operation of an accelerator pedal by a driver. The opening degree of the throttle valve (not shown) of the engine 1 is determined mainly based on the depression amount of the accelerator pedal and is controlled with a throttle actuator. The throttle valve opening degree control of the engine 1 is executed by an engine controller 4.

The engine controller 4 receives signals from an accelerator pedal position sensor 6, an engine speed sensor 7 and a brake pedal position sensor 8. The accelerator pedal position sensor 6 is arranged and configured to detect the position of the accelerator pedal. The engine speed sensor 7 is provided on the engine 1 and is configured to detect the engine speed. The brake pedal position sensor 8 is arranged and configured to detect the position of the brake pedal. The engine controller 4 controls the throttle valve opening degree based on the detected accelerator position and the detected engine speed. The engine controller 4 then controls a fuel injection quantity based on the throttle opening (intake air quantity).

The automatic transmission 2 is preferably a V-belt type or toroidal continuously variable transmission arranged along the driving force transmission path between the engine 1 and the wheels.

The transmission controller 5 receives as input the accelerator position signal via the engine controller 4. The transmission controller 5 also receives an input rotational speed signal indicating a rotational speed associated with an input shaft of the automatic transmission 2 that is connected to the torque converter 3 and an output rotational speed signal indicating a rotational speed associated with an output shaft of the automatic transmission 2 that is connected to the wheels in a manner that is not shown in the figures. The output rotational speed is equivalent to the vehicle speed.

The transmission controller 5 controls the shifting of the automatic transmission 2 by executing a well-known control program (not shown) based on the aforementioned input information.

First, the transmission controller 5 finds a target value for an input rotational speed that is well-suited to the current driving conditions based on the vehicle speed calculated based on the output rotational speed, the accelerator position, and a preset shift pattern. The target input rotational speed is calculated as a target gear ratio.

If the target gear ratio and the current gear ratio are the same, then the transmission controller 5 does not issue a shift command such that shifting does not occur and the currently selected gear ratio remains in effect. Meanwhile, if the currently selected gear ratio and the target gear ratio are different, then the transmission controller 5 executes shift control by issuing a shift command such that the automatic transmission 2 shifts from the currently selected gear ratio to the target gear ratio. The automatic transmission 2 executes the shift operation in response to the shift command issued from the transmission controller 5.

The transmission controller 5 also includes an automatic transmission shift control apparatus in which engine braking can be controlled during coasting such that a feeling of deceleration is obtained when coasting starts regardless of the vehicle speed at the time when coasting starts and, afterwards, the feeling of deceleration ceases as the vehicle speed declines. As a result, engine braking can be precisely controlled such that the vehicle decelerates in a manner that a driver would expect.

Figure 2:
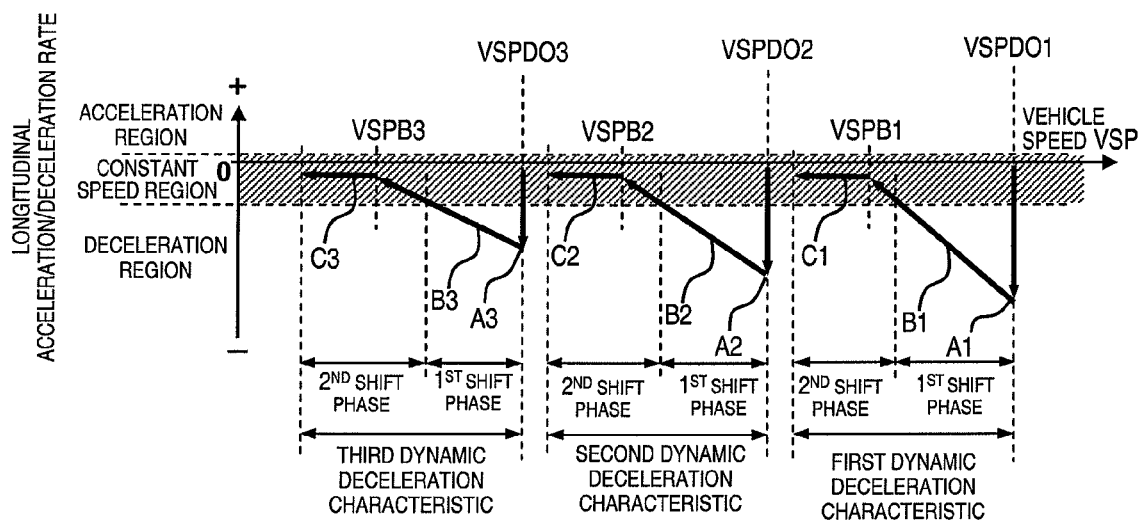
FIG. 2 is an explanatory diagram showing dynamic deceleration characteristics employed during coasting in accordance with the first embodiment.

FIG. 2 is a dynamic characteristic diagram illustrating a dynamic characteristic of the deceleration of the vehicle with respect to the vehicle speed (hereinafter called "dynamic deceleration characteristic") during coasting when a shift control in accordance with this embodiment is employed. In FIG. 2, the vehicle speed VSP is indicated on the horizontal axis and the longitudinal acceleration/deceleration is indicated on the vertical axis. When the longitudinal acceleration/deceleration is negative, it will be called "deceleration." Thus, as the longitudinal acceleration/deceleration moves farther away from zero in the negative direction, the deceleration increases.

The dynamic deceleration characteristic is set based on the vehicle speed that exists at the time when coasting starts. For example, a first dynamic deceleration characteristic corresponding to when the vehicle starts coasting from a high vehicle speed VSPDO1 has a prescribed coasting start deceleration rate (A1) in a deceleration region, an intermediate deceleration rate (B1) where the deceleration rate is reduced at a prescribed reduction rate from the prescribed coasting start deceleration rate A1, and a final deceleration rate (C1) where a prescribed deceleration rate is achieved in a constant speed region. Similarly, a second dynamic deceleration characteristic corresponding to when the vehicle starts coasting from a vehicle speed VSPDO2 has transitional deceleration rates A2, B2, and C2 and a third dynamic deceleration characteristic corresponding to when the vehicle starts coasting from a low vehicle speed VSPDO3 has transitional deceleration rates A3, B3, and C3.

Each of these first to third dynamic deceleration characteristics is set individually based on the vehicle speed that exists at the time when coasting starts and is contrived such that, during coasting, the deceleration rate of the vehicle changes from a deceleration region to a constant speed region as the vehicle speed declines.

The deceleration region mentioned in this embodiment is a longitudinal acceleration/deceleration region in which the driver is imparted with a feeling of deceleration; it is a region in which the deceleration rate is somewhat large. Meanwhile, the constant speed region is longitudinal acceleration/deceleration region in which the driver is not imparted with a feeling of deceleration and, instead, feels as though the vehicle is traveling at a constant speed. The constant speed region is a region in which the deceleration rate is 0 or small (includes a region ranging from a very small deceleration rate to a negative deceleration rate).

During coasting, the transmission controller 5 controls the gear ratio of the automatic transmission 2 such that the actual deceleration rate follows a dynamic deceleration characteristic as described above. The transmission controller 5 basically includes, among other things, a first shift phase control section and a second shift phase control section. The first shift phase control section controls a gear ratio of the automatic transmission 2 using a first shift phase control after detecting the vehicle coasting condition has started such that a deceleration rate of the vehicle enters a deceleration region. The second shift phase control section control the gear ratio of the automatic transmission 2 after the first shift phase control ends such that the deceleration rate of the vehicle enters a constant speed region.

Figure 3:
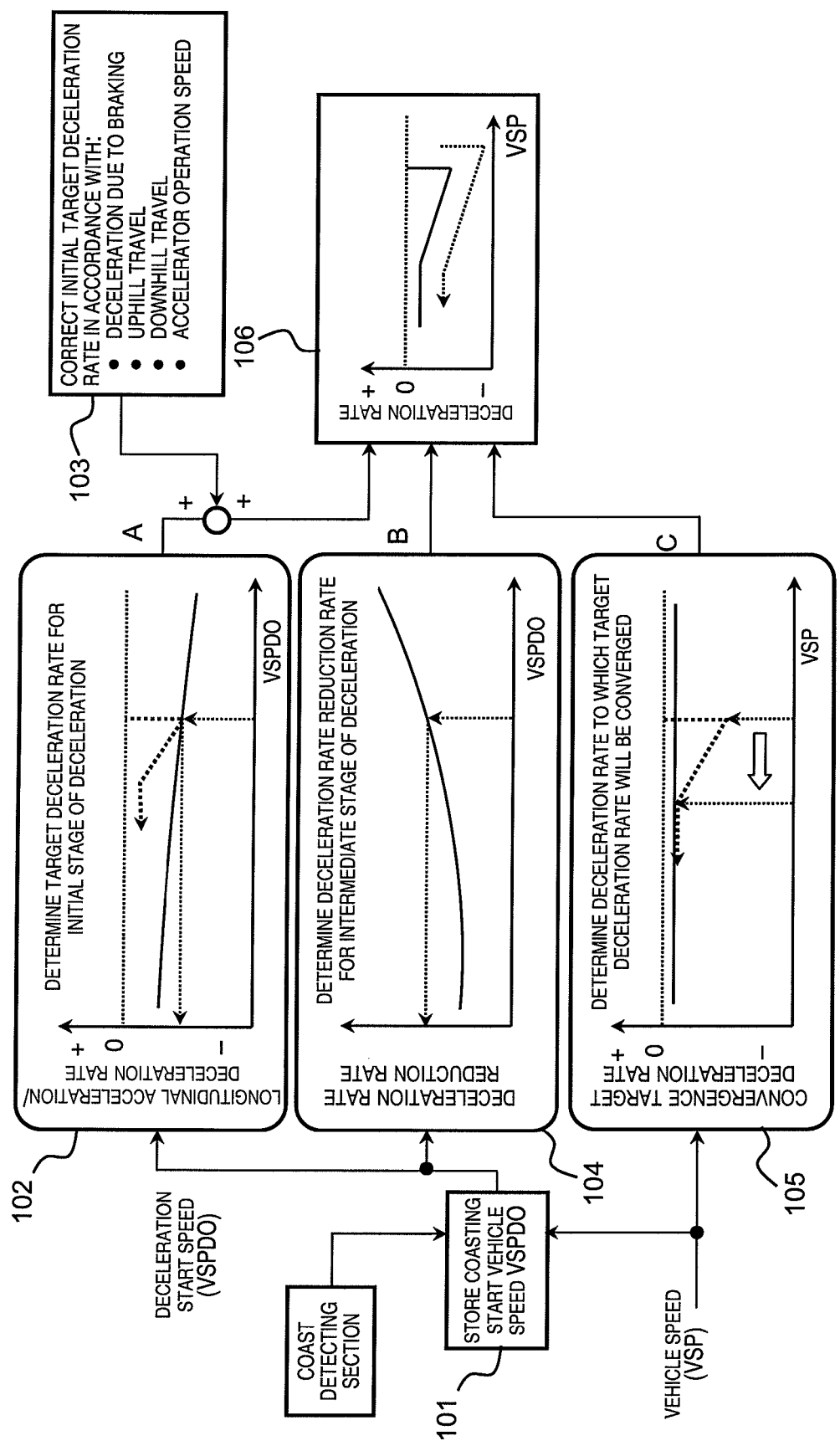
FIG. 3 is a block diagram illustrating the automatic transmission shift control apparatus that executes a shift control during coasting in accordance with the first embodiment.
Figure 6:
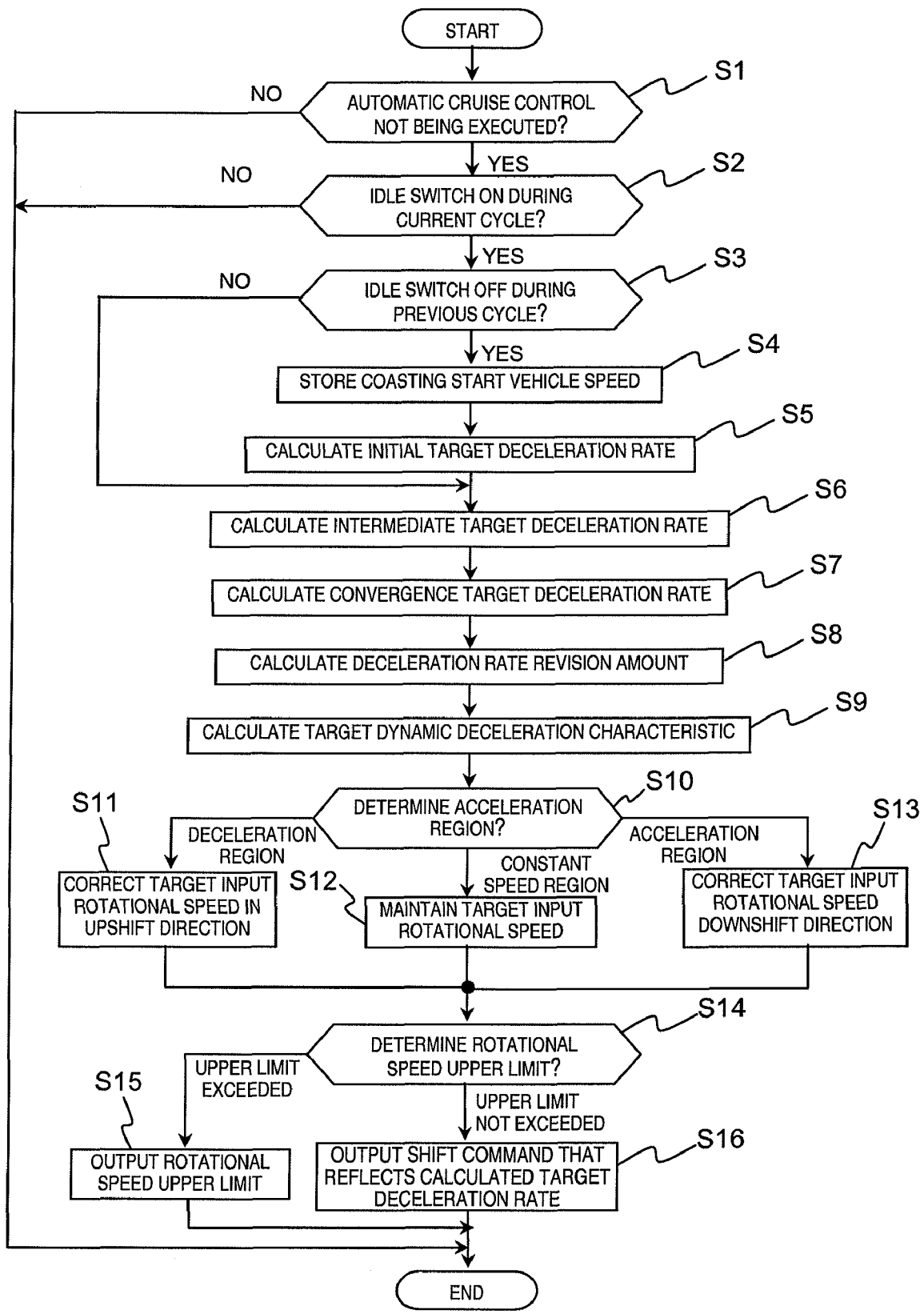
FIG. 6 is a flowchart showing the shift control executed by the automatic transmission shift control apparatus during coasting in accordance with the first embodiment.

In this embodiment, one of the dynamic deceleration characteristics described above is used as a target dynamic deceleration characteristic and the transmission controller 5 shift controls the automatic transmission 2 so as to achieve the target deceleration rate by executing the processing shown in the block diagram of FIG. 3 and the flowchart of FIG. 6.

The shift control executed during coasting will now be explained with reference to the block diagram shown in FIG. 3. As seen in FIG. 3, the transmission controller 5 includes a shift control device having a coasting start vehicle speed detecting section 101, an initial target deceleration rate setting section 102, an intermediate target deceleration rate setting section 104, a convergence target deceleration rate setting section 105 and a coasting target dynamic deceleration characteristic setting section 106. Basically, the sections 102, 103 and 104 together with section 106 constitute the first shift phase control section, while the section 105 together with section 106 constitutes a second shift phase control section.

The coasting start vehicle speed detecting section 101 receives a signal indicating the vehicle speed VSP (which varies over time) and an indication that coasting has started from a coast detecting section (e.g., the sensor 6) and stores (in a memory) the vehicle speed VSP corresponding to when coasting starts as a coasting start vehicle speed VSPDO. The coasting start vehicle speed VSPDO is sent to the initial target deceleration setting section 102 and the intermediate target deceleration rate setting section 104.

The initial target deceleration rate setting section 102 refers to a characteristic diagram or map like that shown inside the box of the initial target deceleration rate setting section 102 in FIG. 2. The characteristic diagram or map is stored in advance, and sets an initial target deceleration rate A for the start of coasting based on the received coasting start vehicle speed VSPDO. The initial target deceleration rate A is equivalent to the prescribed coasting start deceleration rates A1, A2 and A3 shown in FIG. 2. The initial target deceleration rate A relates to an initial stage of deceleration resulting from coasting. The initial target deceleration rate setting section 102 sets the initial target deceleration rate such that as the coasting start vehicle speed VSPDO becomes lower, the initial target deceleration rate becomes smaller. Inside the box of the initial target deceleration rate setting section 102, the dynamic deceleration characteristic associated with the set initial target deceleration rate is indicated with a bold broken line.

The set initial target deceleration rate A is sent to the coasting target dynamic deceleration characteristic setting section 106.

The initial target deceleration rate correcting section 103 corrects the initial target deceleration rate A based on such factors as the speed at which the driver depresses a brake pedal and/or the accelerator pedal and whether the vehicle is traveling uphill (upwardly sloping surface) or downhill (downward sloping surface) and sends the corrected initial target deceleration rate A to the coasting target dynamic deceleration characteristic setting section 106.

The intermediate target deceleration rate setting section 104 refers to a characteristic diagram or map like that shown inside the box of the intermediate target deceleration rate setting section 104 shown in FIG. 3. This characteristic diagram or map is stored in advance. The intermediate target deceleration rate setting section 104 determines a deceleration rate reduction rate based on the received coasting start vehicle speed VSPDO. The intermediate target deceleration rate setting section 104 then sets an intermediate target deceleration rate B such that it gradually decreases from the initial target deceleration rate A at the deceleration rate reduction rate.

As shown in FIG. 2, the initial target deceleration rate A (A1, A2, A3) is expressed as a point while the intermediate target deceleration rate B (B1, B2, B3) is expressed as a straight line calculated using the equation shown below.

Intermediate target deceleration rate B=Initial target deceleration rate A−Deceleration rate reduction rate ×Amount of time elapsed since coasting started.

As shown in FIG. 2, the deceleration rate reduction rate expresses a rate at which the deceleration becomes smaller per unit of decrease in the vehicle speed. In the embodiment shown in FIG. 3, as the coasting start vehicle speed VSPDO becomes lower, the more gradually the intermediate target deceleration rate B is reduced. It is also acceptable to set the deceleration rate reduction rate to a fixed value and reduce the intermediate target deceleration rate at the same rate regardless of the coasting start vehicle speed VSPDO. The intermediate target deceleration rate B is equivalent to the deceleration rates B1, B2 and B3 shown in FIG. 2 and relates to an intermediate stage of the deceleration resulting from coasting. The set intermediate target deceleration rate B is sent to the coasting target dynamic deceleration characteristic setting section 106.

The convergence target deceleration rate setting section 105 refers to a characteristic diagram or map like that shown inside the box 105 shown in FIG. 3. This characteristic diagram or map is stored in advance. The convergence target deceleration rate setting section 105 sets a target deceleration rate C based on the received vehicle speed VSP. The target deceleration rate C is a final fixed target deceleration rate toward which the intermediate target deceleration rate B will be reduced in a converging fashion. In the embodiment shown in FIG. 3, the convergence target deceleration rate C is a fixed value that does not change depending on the vehicle speed VSP. It is also acceptable to vary the convergence target deceleration rate C in accordance with the vehicle speed VSP.

For example, it is also acceptable to set the convergence target deceleration rate C such that as the coasting start vehicle speed VSPDO becomes lower, the convergence deceleration rate C becomes smaller. Furthermore, it is also acceptable to return to a normal shift control based on a well-known program.

The convergence target deceleration rate C is equivalent to the deceleration rates C1, C2 and C3 exemplified in FIG. 2. Inside the box of the convergence target deceleration rate setting section 105, the dynamic deceleration characteristic associated with the set convergence target deceleration rate is indicated with a bold broken line. The set convergence target deceleration rate C is sent to the coasting target dynamic deceleration characteristic setting section 106.

The coasting target dynamic deceleration characteristic setting section 106 sets a target dynamic deceleration rate characteristic like that shown inside the box of the coasting target dynamic deceleration characteristic setting section 106 in FIG. 3 by combining the initial target deceleration rate A, the intermediate target deceleration rate B, and the convergence target deceleration rate C. The coasting target dynamic deceleration characteristic setting section 106 then sets target input rotational speeds corresponding to points along the target dynamic deceleration characteristic in the direction indicated by the broken-line arrow shown inside the box of the coasting target dynamic deceleration characteristic setting section 106 in FIG. 3. More specifically, since the output of the engine 1 has a negative value due to engine braking when the vehicle is coasting, the transmission controller 5 finds target input rotational speeds based on the braking force resulting from the engine braking of the engine 1 using the set initial target deceleration rate A, the intermediate target deceleration rate B, and the convergence target deceleration rate C. The transmission controller 5 then issues shift commands to the automatic transmission 2 so as to achieve gear ratios corresponding to the target input rotational speeds.

The vertical axes of the characteristic diagrams shown inside the boxes of sections 105 and 106 are the same as the longitudinal acceleration. The negative values are deceleration rates with the deceleration rate being smaller when the value is closer to 0.

In this embodiment, once the target dynamic deceleration characteristic comprising the target deceleration rates A to C is set, shift commands are issued so as to achieve the target dynamic deceleration characteristic. However, as described later with reference to FIGS. 9 and 10, it is also acceptable to set a target dynamic gear ratio characteristic directly and control the gear ratio so as to achieve a dynamic deceleration characteristic as shown in FIG. 2. More specifically, it is acceptable to set target gear ratios A to C corresponding to a dynamic deceleration characteristic shown in FIG. 2 and issue shift commands to achieve a target dynamic gear ratio characteristic comprising the target gear ratios A to C. Either way, a target dynamic deceleration characteristic in accordance with this invention is essentially the same as the target dynamic gear ratio characteristic described later.

Figure 4:
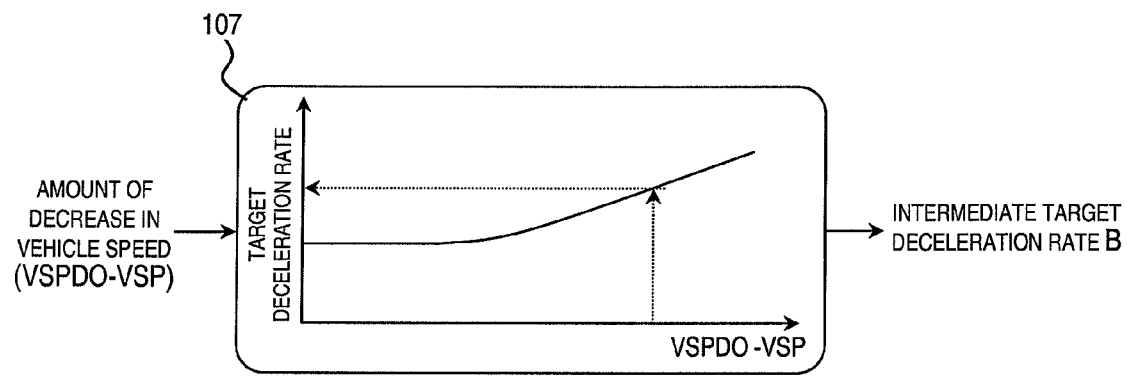
FIG. 4 is a block diagram of an alternative way of obtaining the intermediate target deceleration rate shown in the block diagram of FIG. 3.

Regarding the setting of the intermediate target deceleration rate of the target dynamic deceleration characteristic, it is acceptable to use the intermediate target deceleration rate setting section 107 shown in FIG. 4 instead of the intermediate deceleration rate setting section 104 shown in FIG. 3. The intermediate target deceleration rate setting section 107 is contrived to receive a vehicle speed decrease amount equal to the value obtained by subtracting the current vehicle speed VSP from the coasting start vehicle speed VSPDO (i.e., VSPDO−VSP) and find a target deceleration rate by referring to a pre-stored characteristic diagram like that shown in FIG. 4. In this way, the target deceleration rate can be made to decrease as the vehicle speed decreases.

Figure 5:
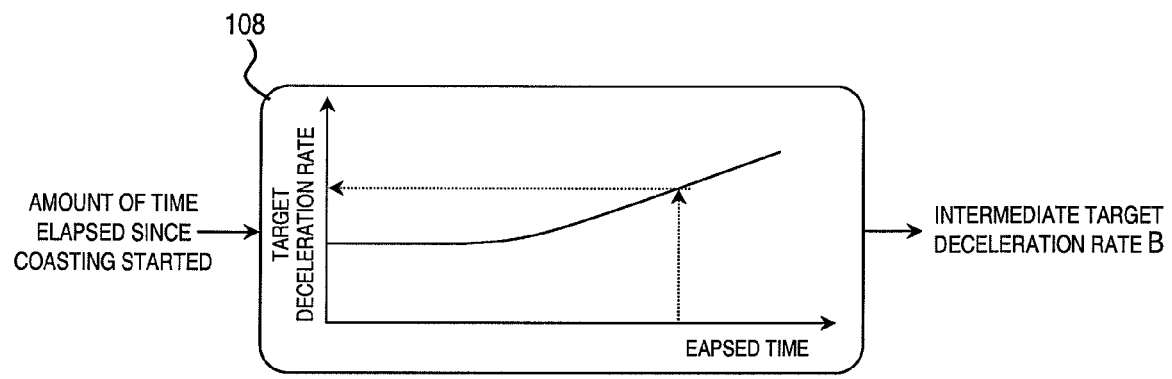
FIG. 5 is a block diagram of an alternative way of obtaining the intermediate target deceleration rate shown in the block diagram of FIG. 3.

It is also acceptable to use the intermediate target deceleration rate setting section 108 shown in FIG. 5 instead of the intermediate target deceleration rate setting section 104 shown in FIG. 3. The intermediate target deceleration rate setting section 108 is contrived to receive a signal indicating the elapsed coasting time, i.e., the amount of time elapsed from when the start of coasting was detected until the current time, and find a target deceleration rate by referring to a pre-stored characteristic diagram like that shown in FIG. 5. In this way, the target deceleration rate can be made to decrease as the vehicle continues to coast.

Separate characteristic diagrams or maps should be prepared for each of the prescribed regions of the vehicle speed VSPDO in the case of the intermediate target deceleration rate setting section 107 shown in FIG. 4 or the intermediate target deceleration rate setting section 108 shown in FIG. 5. Another option is to multiply the target deceleration rate obtained from the characteristic diagram by a coefficient corresponding to the vehicle speed VSPDO in order to obtain the intermediate target deceleration rate B.

The shift control executed during coasting is shown in the flowchart of FIG. 6. Control processing of FIG. 6 is executed repetitively by using a regular interrupt. In step S1, the transmission controller 5 confirms that an automatic cruise control that maintains the vehicle speed substantially fixed at a target vehicle speed is not being executed. If an automatic cruise control is being executed (No), then the control of the flowchart ends immediately. If the automatic cruise control is not being executed (Yes), then the transmission controller 5 proceeds to step S2.

In step S2, the transmission controller 5 checks if an idle switch (part of the sensor 6) is on during the current cycle of the flowchart. Step S2 constitutes a deceleration operating condition detecting section that detects a vehicle coasting condition. The idle switch (part of the sensor 6) is installed on an accelerator pedal operated by the driver and detects if the depression amount of the accelerator pedal, i.e., the accelerator position, is 0. If the idle switch (part of the sensor 6) is off (No), then the accelerator position is larger than 0 and the vehicle is not coasting. The transmission controller 5 therefore stores the fact that the idle switch is off and ends the flowchart. Conversely, if the idle switch is on (Yes), then the transmission controller 5 proceeds to step S3.

In step S3, the transmission controller 5 checks if the idle switch (part of the sensor 6) was off during the previous cycle of the flowchart. If the idle switch (part of the sensor 6) was on in the previous cycle in addition to being on in the current cycle (No), then the vehicle was already coasting before the current cycle and the transmission controller 5 skips steps S4 and S5 and proceeds to step S6, where it calculates the previously described intermediate target deceleration rate. Conversely, if the idle switch (part of the sensor 6) was off in the previous cycle (Yes), then coasting is starting and the transmission controller 5 proceeds to step S4.

In step S4, the transmission controller 5 detects the vehicle speed corresponding to the start of coasting and stores (in memory) this vehicle speed as the coasting start vehicle speed VSPDO.

In step S5, the transmission controller 5 calculates an initial target deceleration rate A corresponding to when coasting started based on the coasting start vehicle speed stored in step S4. The initial target deceleration rate A is similar to the deceleration rates A1 to A3 exemplified in FIG. 2.

In step S6, the transmission controller 5 calculates an intermediate target deceleration rate B that is a target deceleration rate used during coasting. The intermediate target deceleration rate B is similar to the deceleration rates B1 to B3 exemplified in FIG. 2.

In step S7, the transmission controller 5 calculates a convergence target deceleration rate C. The convergence target deceleration rate C is equivalent to the deceleration rates C1 to C3 exemplified in FIG. 2.

In step S8, the transmission controller 5 corrects the initial target deceleration rate A and the intermediate target deceleration rate B calculated in steps S5 and S6 as necessary depending on the speed at which the driver operates the brake or depresses the accelerator and whether the vehicle is traveling uphill or downhill.

In step S9, the transmission controller 5 calculates the target dynamic deceleration characteristic for use during coasting by combining the initial target deceleration rate A, the intermediate target deceleration rate B, and the convergence target deceleration rate C.

In step S10, the transmission controller 5 detects the actual deceleration rate of the vehicle based on the change in the actual vehicle speed and compares the actual detected deceleration rate to the current target deceleration rate. Thus, the transmission controller 5 determines if the actual detected deceleration rate equals the current target deceleration rate determined based on the target dynamic deceleration characteristic, is on the deceleration side of the target deceleration rate, or is on the acceleration side of the target deceleration rate. It is acceptable, also, to establish a prescribed range of the vertical axis of the target dynamic deceleration characteristic as a band-shaped target dynamic deceleration characteristic (target deceleration characteristic region). In such a case, in step S10, the transmission controller 5 determines if the actual deceleration rate is within the target deceleration characteristic region, on the deceleration side of the target deceleration characteristic region, or on the acceleration side of the target deceleration characteristic region.

If the actual deceleration rate is on the deceleration side (deceleration region) of the target deceleration rate, then the transmission controller 5 proceeds to step S11 and corrects the target input rotational speed of the automatic transmission 2 in the upshift direction. In this way, the target deceleration rate is obtained by decreasing an excessive deceleration rate. The transmission controller 5 then proceeds to step S14.

If the actual deceleration rate equals the target deceleration rate (or is within the target deceleration rate region), the transmission controller 5 proceeds to step S12 and holds the current gear ratio by not issuing a shift command. In this way, transmission controller 5 continues to achieve the target deceleration rate. The transmission controller 5 then proceeds to step S14.

If the actual deceleration rate is on the acceleration side (acceleration region) of the target deceleration rate, then the transmission controller 5 proceeds to step S13 and corrects the target input rotational speed of the automatic transmission 2 in the downshift direction. In this way, the target deceleration rate is obtained by compensating for an insufficient deceleration rate. The transmission controller 5 then proceeds to step S14.

In step S14, the transmission controller 5 determines if the rotational speed Ne of the engine 1 (i.e., the target input rotational speed of the automatic transmission 2) exceeds a rotational speed upper limit indicating over-revving (excessive rotational speed) of the engine 1. If the engine speed Ne exceeds the rotational speed upper limit, then the transmission controller 5 proceeds to step S15. The not, then the transmission controller 5 proceeds to step S16.

In step S15, the transmission controller 5 issues a shift command that serves to limit the target input rotational speed of the automatic transmission 2 to a gear ratio corresponding to the rotational speed upper limit. Then, the transmission controller 5 ends the flowchart.

In step S16, the transmission controller 5 issues a shift command that serves to control the automatic transmission 2 to a gear ratio corresponding to the target input rotational speed obtained in step S11, S12, or S13. The transmission controller 5 then ends the flowchart.

Figure 7:
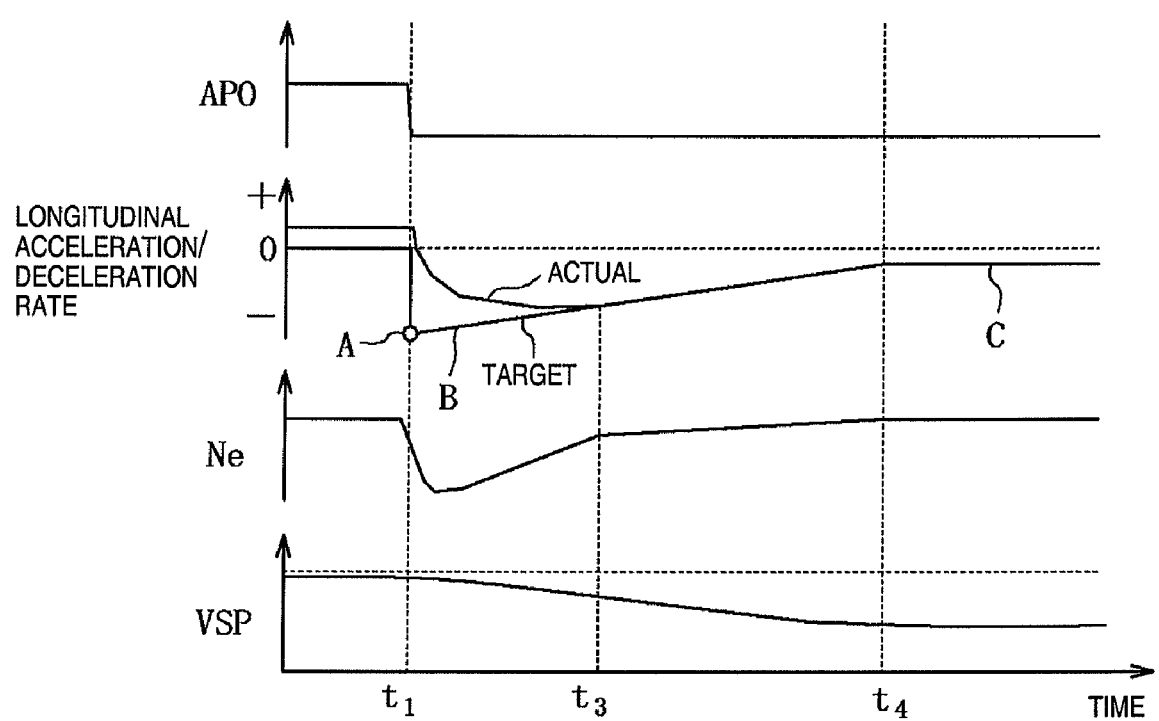
FIG. 7 is a time chart illustrating the shift control executed by the automatic transmission shift control apparatus during coasting in accordance with the first embodiment.

FIG. 7 is a time chart illustrating the shift control of this embodiment during coasting. Assuming the vehicle is traveling down a long declined surface and the driver is depressing the accelerator pedal slightly such that the accelerator position APO is larger than 0, the vehicle starts coasting at a time (moment in time) $t_1$ in FIG. 7 when the driver releases the accelerator pedal. The vehicle was accelerating slightly at a longitudinal acceleration greater than 0 or traveling at a constant speed prior to the time t1. After the time t1, the vehicle starts decelerating and the vehicle speed VSP gradually decreases. The target deceleration rate is 0 until the time t1 and is set to A in accordance with the target dynamic deceleration characteristic at the time t1. The initial target deceleration rate A is comparatively large and a comparatively large downshift is executed in an initial stage of coasting. After the time t1, the target deceleration rate is set to the deceleration rate B and gradually decreased in accordance with the target dynamic deceleration characteristic. The target deceleration rate ultimately converges to the deceleration rate C of the target dynamic deceleration characteristic. The target deceleration rate settles at the deceleration rate C only if the vehicle continues coasting from the time t1 to a time t4. If the driver depresses the accelerator pedal during coasting, then coasting ends and the setting of a target deceleration rate in accordance with a target dynamic deceleration characteristic ceases. In such a case, the target deceleration rate does not reach the deceleration rate C.

The actual deceleration rate (longitudinal acceleration/deceleration rate) follows the target dynamic deceleration characteristic. Thus, at the time t1 the automatic transmission 2 executes a comparatively large downshift and the actual deceleration rate becomes large immediately after the time t1. After the time t1, the actual deceleration rate gradually decreases and approaches the target deceleration rate B. The actual deceleration rate coincides with the target deceleration rate B at a time t3 occurring between the time t1 and the time t4. After the time t3, the actual deceleration rate coincides with the target dynamic deceleration characteristic.

With this embodiment, even if the vehicle speed VSP changes during coasting, a deceleration rate in accordance with the driver's expectations can be achieved during the period from the time t1 (initial stage of coasting) until the approximately the time t3 (intermediate stage of coasting). Then, after the time t4, coasting can be continued at a very small deceleration rate.

Figure 8:
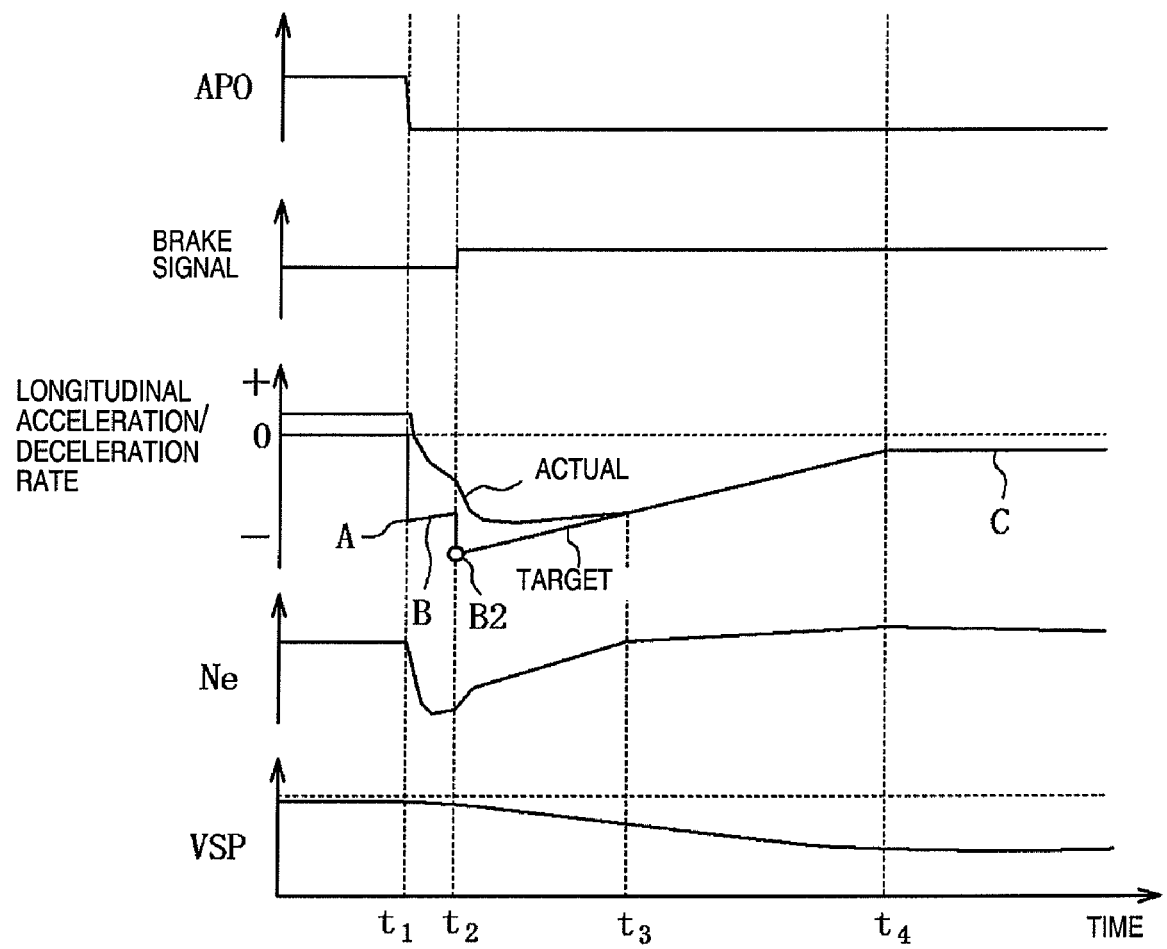
FIG. 8 is a time chart illustrating the shift control executed by the automatic transmission shift control apparatus during coasting in accordance with a second embodiment.

FIG. 8 is a time chart illustrating the shift control executed by an automatic transmission shift control apparatus in accordance with another embodiment of the present invention during coasting. In this other embodiment, too, the engine 1 and the automatic transmission 2 are configured as shown in FIG. 1 and the control flowchart is the same as that shown in FIG. 6. The other embodiment will now be explained by focusing on its differences with respect to the previous embodiment and parts that a different will be indicated with new reference numerals. Explanations of constituent features that are the same as the previous embodiment will be omitted for the sake of brevity.

The shift control illustrated with the time chart shown in FIG. 8 is an example in which the correcting section 103 shown in FIG. 3 corrects the initial target deceleration rate A. The flowchart assumes the vehicle is traveling down a long declined surface and the driver is depressing the accelerator pedal slightly such that the accelerator position APO is larger than 0. Then, the vehicle starts coasting at a time $t_1$ in FIG. 8 when the driver releases the accelerator pedal. Additionally, in this example, the driver depresses a brake pedal at a time t2 between the time t1 and the time t3.

In such a case, the driver clearly expects more deceleration. As described previously, in the initial target deceleration rate correcting section 103 of FIG. 3 and the step S8 of FIG. 6, the transmission controller 5 detects that the brake signal has turned on at the time t2 and corrects the target deceleration rate B that has been executed up until the time t2. As a result, after the time t2, the target deceleration rate is corrected to a deceleration rate B2 that is larger than the deceleration rate B. After the time t2, the target deceleration rate is set to the deceleration rate B2 and gradually decreased in accordance with the corrected target dynamic deceleration characteristic. The target deceleration rate ultimately converges to the deceleration rate C of the target dynamic deceleration characteristic at the time t4. The correction ends at the time t4.

As shown in FIG. 8, the rate at which the actual longitudinal acceleration/deceleration rate changes in the negative direction is slow until immediately before the brake pedal is depressed at the time t2. However, in this embodiment, the rate at which the actual longitudinal acceleration/deceleration rate changes in the negative direction can be increased to a rapid rate immediately after the time t2. Thus, the vehicle can be made to decelerate in accordance with the expectations of a driver.

Figure 9:
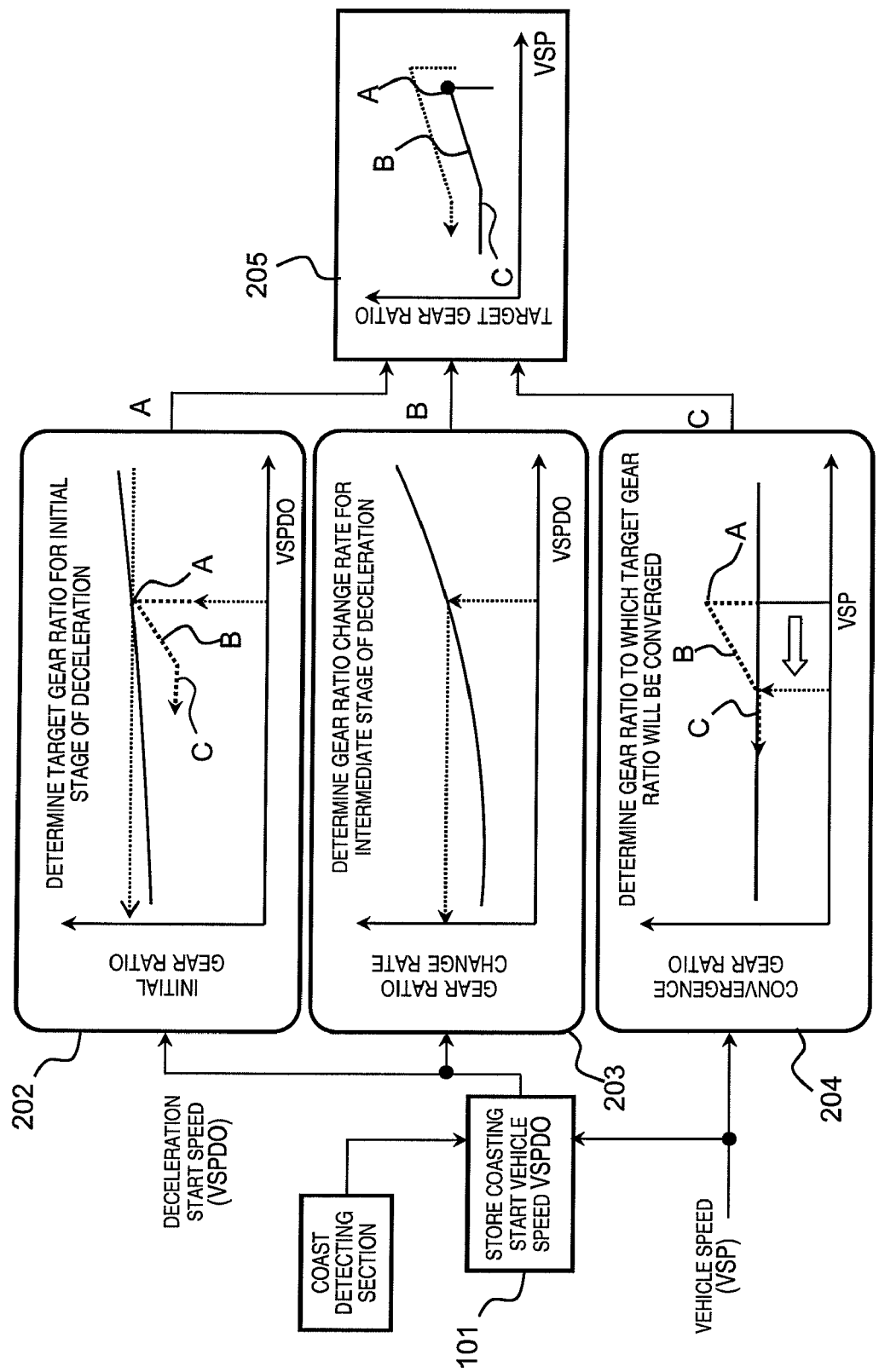
FIG. 9 is a block diagram illustrating the automatic transmission shift control apparatus that executes a shift control during coasting in accordance with the second embodiment.
Figure 10:
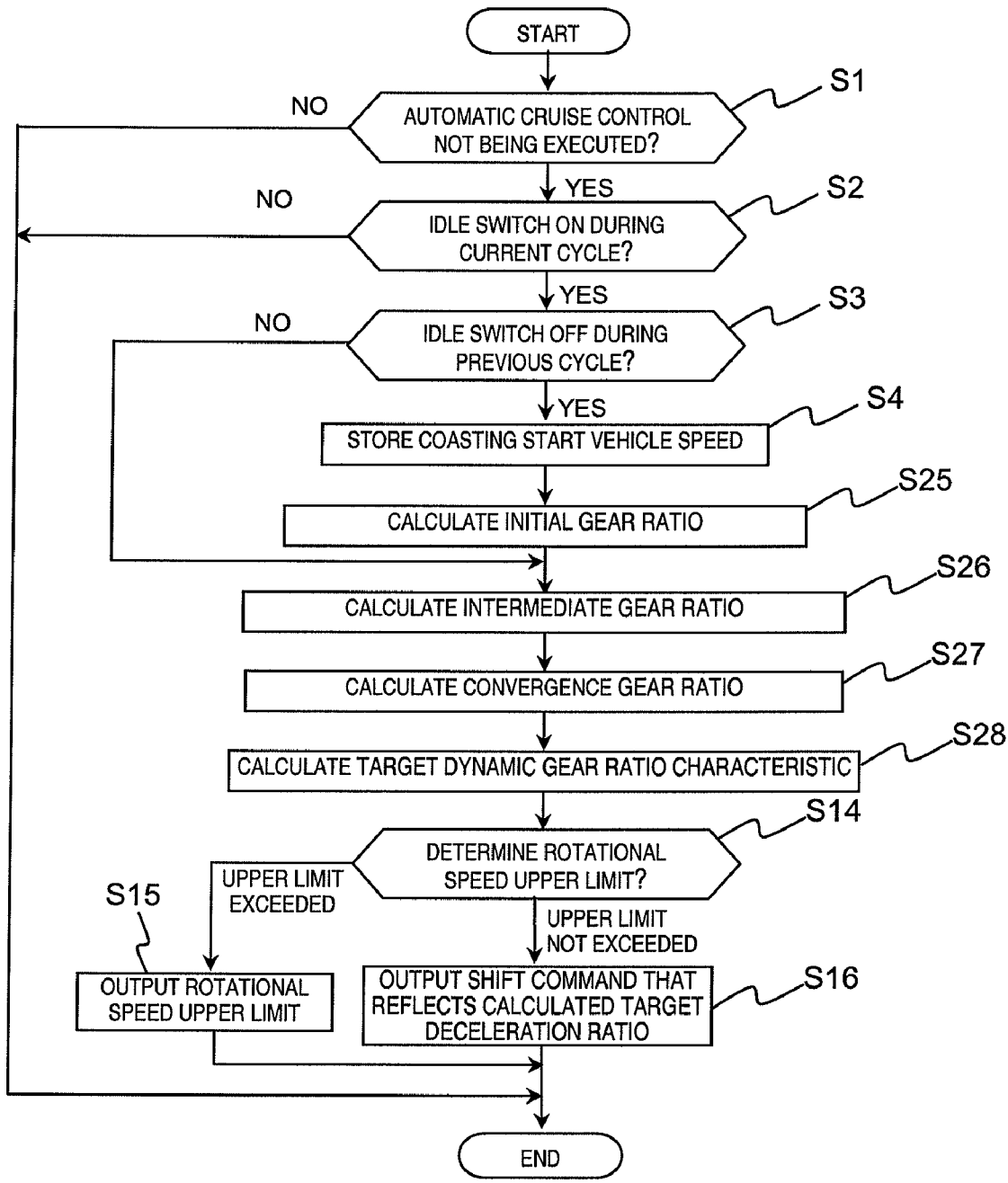
FIG. 10 is a block diagram illustrating the shift control executed during coasting in accordance with the second embodiment.

The block diagram of FIG. 9 and the flowchart of FIG. 10 illustrate the shift control processing executed during coasting by an automatic transmission shift control apparatus in accordance with still another embodiment of the present invention. In this embodiment, too, the engine 1 and the automatic transmission 2 are configured as shown in FIG. 1 and the effects are the same as obtained with the embodiment shown in FIG. 7. This embodiment will now be explained by focusing on its differences with respect to the previous embodiments and parts that a different will be indicated with new reference numerals. Explanations of constituent features that are the same as the previous embodiments will be omitted for the sake of brevity.

In this embodiment, the target dynamic deceleration characteristic of the previous embodiments is replaced with a target dynamic gear ratio characteristic contrived to achieve a dynamic deceleration characteristic like those shown in FIG. 2 and the transmission controller 5 executes the processing shown in the block diagram of FIG. 9. In FIG. 9, the coasting start vehicle speed detecting section 101 feeds the coasting start vehicle speed VSPDO to an initial target gear ratio setting section 202 and an intermediate target gear ratio setting section 203.

The initial target gear ratio setting section 202 refers to a pre-stored characteristic diagram or map like that shown inside the box of the initial target gear ratio setting section 202 in FIG. 9. The initial target gear ratio setting section 202 sets an initial target gear ratio A for the start of coasting based on the received coasting start vehicle speed VSPDO. The initial target gear ratio A relates to an initial stage of deceleration resulting from coasting. The initial target gear ratio setting section 202 sets the initial target gear ratio such that the lower the coasting start vehicle speed VSPDO is, the smaller the initial deceleration rate is. Inside the box of the initial target gear ratio setting section 202, the target dynamic gear ratio characteristic associated with the set initial target gear ratio A is indicated with a bold broken line.

The set initial target gear ratio A is sent to a coasting target dynamic gear ratio characteristic setting section 205.

The intermediate target gear ratio setting section 203 refers to a pre-stored characteristic diagram or map like that shown inside the box of the intermediate target gear ratio setting section 203 shown in FIG. 9. The intermediate target gear ratio setting section 203 determines a target gear ratio change rate based on the received coasting start vehicle speed VSPDO. The intermediate target gear ratio setting section 203 then sets an intermediate target gear ratio B such that it gradually decreases from the initial target gear ratio A at the target gear ratio change rate.

As shown inside the box of the coasting target dynamic gear ratio characteristic setting section 205 in FIG. 9, the initial target gear ratio A is expressed as a point while the intermediate target gear ratio B is expressed as a straight line calculated using the equation shown below.

Intermediate target gear ratio B = Initial target gear ratio A−Target gear ratio change rate×Amount of time elapsed since coasting started The target gear ratio change rate expresses a rate at which the target gear ratio changes per unit of decrease in the vehicle speed. In the embodiment shown in FIG. 9, the higher the coasting start vehicle speed VSPDO is, the more rapidly the intermediate target gear ratio B is reduced.

It is also acceptable to set the target gear ratio change rate to a fixed value and reduce the intermediate target gear ratio at the same rate regardless of the coasting start vehicle speed VSPDO. Inside the box of the intermediate target gear ratio setting section 203, the target dynamic gear ratio characteristic associated with the set intermediate target gear ratio B is indicated with a bold line. The intermediate target gear ratio B is a target gear ratio for use during deceleration resulting from coasting.

The set intermediate target gear ratio B is sent to the coasting target dynamic gear ratio characteristic setting section 205.

The convergence target gear ratio setting section 204 refers to a pre-stored characteristic diagram or map like that shown inside the box of the convergence target gear ratio setting section 204 shown in FIG. 9. The convergence target gear ratio setting section 204 sets a target gear ratio C based on the received vehicle speed VSP. The target gear ratio C is a final fixed target gear ratio toward which the intermediate target gear ratio B will be reduced in a converging fashion. In the embodiment shown in FIG. 9, the convergence target gear ratio C is a fixed value that does not change depending on the vehicle speed VSP. It is also acceptable to set the convergence target gear ratio C such that as the coasting start vehicle speed VSPDO becomes lower, the convergence deceleration rate C becomes smaller. Furthermore, it is also acceptable to return to a normal shift control based on a well known program. Inside the box of the convergence target gear ratio setting section 204, the target dynamic gear ratio characteristic associated with the set convergence target gear ratio C is indicated with a bold broken line. The convergence target gear ratio C is a target gear ratio corresponding to a final deceleration rate to be reached during coasting.

The set convergence target gear ratio C is sent to the coasting target dynamic gear ratio characteristic setting section 205.

The coasting target dynamic gear ratio characteristic setting section 205 sets a target dynamic gear ratio characteristic like that shown inside the box of the coasting target dynamic gear ratio characteristic setting section 205 in FIG. 9 by combining the initial target gear ratio A, the intermediate target gear ratio B, and the convergence target gear ratio C. The transmission controller 5 then issues shift commands to the automatic transmission 2. The shift commands correspond to points along the target dynamic gear ratio characteristic in the direction indicated by the broken-line arrow shown inside the box of the coasting target dynamic gear ratio characteristic setting section 205.

The transmission controller 5 executes the control processing shown in the flowchart of FIG. 10. In the flowchart of FIG. 10, steps S1 to S4 are the same as explained previously with reference to FIG. 6. However, from step S4, the transmission controller 5 proceeds to step S25. Or, the transmission controller 5 proceeds from step S3 to step S26.

In step S25, the transmission controller 5 calculates an initial target gear ratio A corresponding to when coasting started based on the coasting start vehicle speed stored in step S4.

In step S26, the transmission controller 5 calculates an intermediate target gear ratio B that is a target gear ratio used during coasting.

In step S27, the transmission controller 5 calculates a convergence target gear ratio C toward which the intermediate target gear ratio B will be reduced in a converging manner.

In step S28, the transmission controller 5 calculates a target dynamic gear ratio characteristic, i.e., a target input rotational speed, for use during coasting by combining the initial target gear ratio A, the intermediate target gear ratio B, and the convergence target deceleration ratio C. The transmission controller 5 then proceeds to step S14.

In step S14, the transmission controller 5 determines if the rotational speed Ne of the engine 1 (i.e., the target input rotational speed of the automatic transmission 2) exceeds a rotational speed upper limit indicating over-revving (excessive rotational speed) of the engine 1. If the engine speed Ne exceeds the rotational speed upper limit, the transmission controller 5 proceeds to step S15. The not, then the transmission controller 5 proceeds to step S16.

In step S15, the transmission controller 5 issues a shift command that serves to limit the target input rotational speed of the automatic transmission 2 to a gear ratio corresponding to the rotational speed upper limit. Then, the transmission controller 5 ends the flowchart.

In step S16, the transmission controller 5 issues a shift command that serves to control the automatic transmission 2 to a gear ratio corresponding to the target input rotational speed obtained in step S11, S12, or S13.

In the embodiment shown in FIG. 10, it is also acceptable to provide an additional step between steps S27 and S28 for correcting the initial target gear ratio A as necessary depending on the speed at which the driver operates the brake or depresses the accelerator and whether the vehicle is traveling uphill or downhill.

With a shift control technology existing prior to the present invention, the deceleration rate obtained due to engine braking is the same when the accelerator position becomes substantially 0 while the vehicle is traveling in a low speed region as when the accelerator position becomes substantially 0 while the vehicle is traveling in a high speed region and, afterwards, the vehicle speed decreases to a low speed region. Conversely, different deceleration rates can be obtained with the embodiments described heretofore because they are provided with the following: steps S2 and S3 that serve to determine when the vehicle starts coasting; a step S4 that serves to detect the vehicle speed VSPDO at the time when coasting starts; steps S5 and S6 that serve to set an initial target deceleration rate A that is a target deceleration rate for when coasting starts and is set based on the coasting start vehicle speed VSPDO and an intermediate target deceleration rate B that is a target deceleration rate for using during coasting and is gradually reduced from the initial target deceleration rate A; and steps S11 and S13 that serve to issue a shift command such that the set initial target deceleration rate A and the intermediate target deceleration rate B are realized with a braking force produced by engine braking of the engine 1. Even if the vehicle speed changes between the initial stage of coasting and the intermediate and later stages of coasting, a deceleration rate in accordance with a driver's expectation can be obtained.

In step S5 of the embodiment, the initial target deceleration rate A is set to be smaller when the coasting start vehicle speed VSPDO is lower, as shown with the characteristic diagrams in the boxes 102 of FIGS. 2 and 3. As a result, even if the vehicle speed declines, the occurrence of an excessive feeling of deceleration can be prevented and a deceleration rate in accordance with a driver's expectation can be obtained.

In step S7 of the embodiment, as shown with the characteristic diagram inside the box 105 of FIGS. 2 and 3, the intermediate target deceleration rate B converges to a fixed convergence target deceleration rate C if the coasting lasts longer than a prescribed period of time. As a result, a minimum required deceleration rate is secured during coasting.

If the driver operates a brake, then in step S8 of the embodiment the initial target deceleration rate A is increased as shown in the initial target deceleration rate correcting section 103 of FIG. 3 and the time chart of FIG. 8. In this way, the braking force resulting from the brake operation can be assisted with the engine braking that is already being employed during coasting. As a result, the driver is comforted by obtaining an even larger deceleration rate with a given brake pedal depression force.

It is also acceptable to increase both the initial target deceleration rate A and the intermediate target deceleration rate B when a brake operation occurs.

In step S8 of the embodiment, as shown in the initial target deceleration rate correcting section 103 of FIG. 3, the initial target deceleration rate A is decreased when coasting starts while the vehicle is traveling uphill. If a dynamic deceleration characteristic optimized for a flat surface is used on an inclined surface, then the deceleration rate will seem excessive. Step S8 makes it possible to prevent this problem and obtain a natural deceleration rate regardless of the slope of the surface on which the vehicle is traveling.

In step S8 of the embodiment, as shown in the initial target deceleration rate correcting section 103 of FIG. 3, the initial target deceleration rate A is increased when coasting starts while the vehicle is traveling downhill. If a dynamic deceleration characteristic optimized for a flat surface is used on an inclined surface, then the deceleration rate will seem insufficient. Step S8 makes it possible to prevent this problem and obtain a natural deceleration rate regardless of the slope of the surface on which the vehicle is traveling.

In the embodiment, the speed (rate) at which the driver releases the accelerator pedal when coasting starts is detected and, in step S8, the initial target deceleration rate A is set such that the larger the speed at which the accelerator pedal was operated (released), the smaller the value of the initial target deceleration rate A becomes (as shown in the initial target deceleration rate correcting section 103 of FIG. 3). As a result, when the driver releases the accelerator pedal rapidly, a large deceleration rate that is well-suited to the intent of the driver can be obtained and the driving performance is improved.

In the embodiment, if it is determined in step S1 that an automatic cruise control that holds the vehicle speed VSP substantially constant is in progress, then the transmission controller 5 prohibits execution of step S2 and later steps to avoid setting a target deceleration rate for coasting. As a result, a situation in which the driver's desire to travel at a constant speed is contradicted by the imposition of a coasting deceleration rate that causes the vehicle speed to decreases can be prevented. In this way, constant speed travel and deceleration accompanying coasting can be separated from each other such that the vehicle travels in accordance with the driver's expectations.

While in the previously described embodiments a dynamic deceleration rate characteristic (target dynamic deceleration rate characteristic or target dynamic gear ratio characteristic) is set as shown in FIG. 2 each time coasting occurs in order to execute deceleration control (shift control) during coasting, it is also possible to realize the deceleration control in a different way by setting target deceleration rates in accordance with the vehicle speed.

Figure 11:
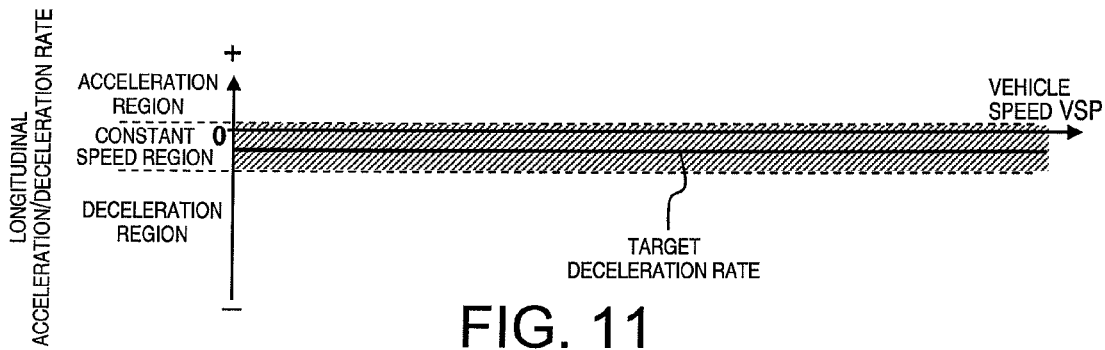
FIG. 11 is an explanatory diagram showing the target deceleration rate set to a fixed value lying in the constant speed region during coasting.

For example, as shown in FIG. 11, the target deceleration rate could be set to a fixed value lying in a constant speed region. Although this method would be advantageous from the perspective of fuel economy, it would not provide the driver with a feeling of deceleration.

Figure 12:
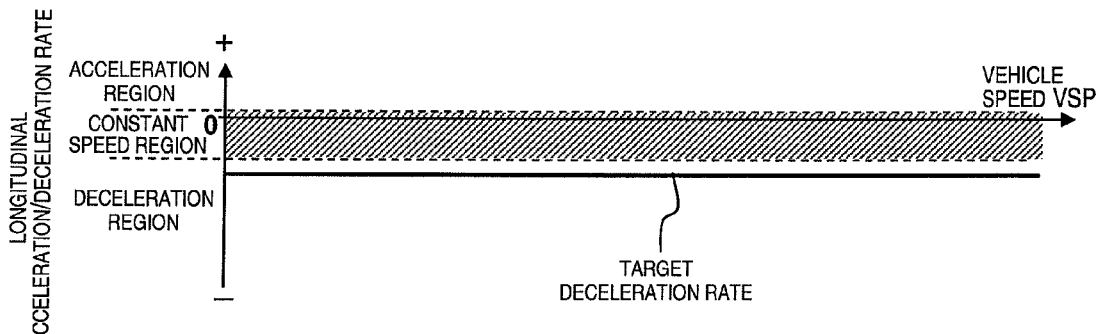
FIG. 12 is an explanatory diagram showing the target deceleration rate set to a fixed value lying in the deceleration region during coasting.

In order to emphasize imparting a feeling of deceleration to the driver during coasting, it is possible to set the target deceleration rate to a fixed value in a deceleration region as shown in FIG. 12. However, this method, too, incurs a problem. Namely, since the traveling resistance of the vehicle (mainly rolling resistance) decreases as the vehicle speed decreases, it becomes necessary to downshift the transmission in order to obtain the same deceleration rate even at lower vehicle speeds. Consequently, the engine speed increases and becomes larger than necessary in low speed regions, causing the driver to experience a feeling that something is odd about the vehicle.

Figure 13:
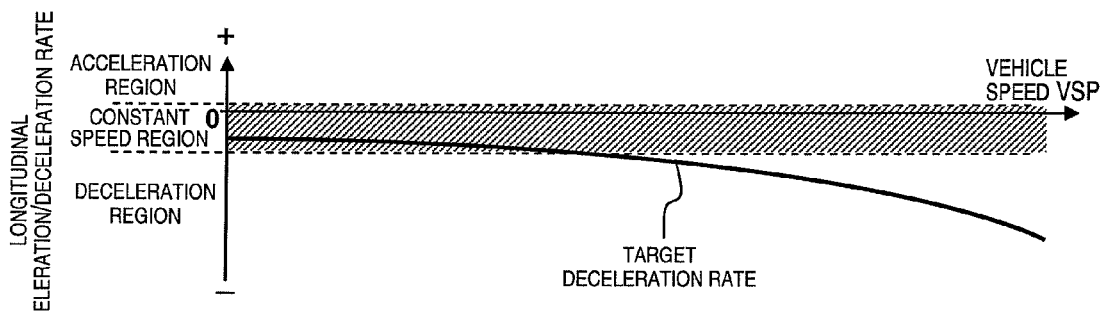
FIG. 13 is an explanatory diagram showing the target deceleration rate set to a decreasing value staring in the constant speed region and ending in the deceleration region during coasting.

In order to emphasize imparting a feeling of deceleration to the driver during coasting while also preventing the engine speed from becoming unnecessarily large in a low speed region, it is possible to set the target deceleration rate to decrease as the vehicle speed decreases such that its value is in a deceleration region when the vehicle speed is high and a constant speed region when the vehicle speed is low as seen in FIG. 13. However, with this method, a feeling of deceleration cannot be imparted to the driver when the vehicle starts coasting from a low speed.

In other words, none of these alternative methods of FIGS. 11 to 13 are able to achieve the goal of imparting a feeling of deceleration to the driver during coasting while also preventing the engine speed from becoming larger than necessary.

Conversely, in the first and second embodiments, the transmission controller 5 executes a first shift phase control after coasting starts that serves to control the gear ratio such that a deceleration rate of the vehicle enters a deceleration region and a second shift phase control after the first shift phase ends that serves to control the gear ratio such that the deceleration rate of the vehicle enters a constant speed region. In this way, a dynamic deceleration characteristic like those shown in FIG. 2 can achieved each coasting situation and a feeling of deceleration can be imparted to the driver during coasting while preventing the engine speed from becoming unnecessarily high in a low speed region and causing the driver to experience a feeling that something is odd about the vehicle.

A more detailed explanation will now be provided.

Firstly, the feeling of deceleration that this embodiment imparts to the driver during coasting will be explained. Consider, for example, a driving situation in which the driver causes the vehicle to coast in order to adjust the headway distance with respect to a preceding vehicle. When the driver releases the accelerator pedal in order to adjust the headway distance, the driver is selecting to coast in order to increase the headway distance. Therefore, a feeling of deceleration associated with decelerating the vehicle is required immediately after the driver releases the accelerator and coasting starts, but deceleration is not required any more after the vehicle speed has decreased to some degree and the headway distance has increased. In other words, the driver requires a deceleration rate mainly at the start of coasting (initial stage of coasting). With this embodiment, the deceleration rate required by the driver can be obtained because a feeling of deceleration can be imparted to the driver at the start of coasting by changing the deceleration rate from a deceleration region to a constant speed region.

Next, the manner in which the embodiments can prevent the engine rotational speed from becoming unnecessarily large in a low vehicle speed region and prevent the driver from experiencing a feeling that something is odd about the vehicle will be explained. Since the embodiments are contrived to change the deceleration rate from a deceleration region to a constant speed region during coasting, even if, for example, coasting starts from a low vehicle speed region, a feeling of deceleration can be imparted to the driver when coasting starts and, afterwards, the deceleration rate can be quickly lowered into a constant speed region. As a result, the engine rotational speed can be prevented from becoming unnecessarily large and the driver can be prevented from experiencing a feeling that something is odd about the vehicle.

In the embodiments, when the transmission controller 5 executes the first shift phase control, it controls the gear ratio such that the deceleration rate is set to a prescribed coasting start deceleration rate and then decreases at a prescribed reduction rate. As a result, the transmission upshifts while a feeling of deceleration is being imparted to the driver. Thus, the engine speed is prevented from becoming unnecessarily large even during the first phase control and the driver can be prevented from experiencing a feeling that there is something odd about the vehicle.

The size of deceleration rate required by the driver differs depending on the vehicle speed at the time when coasting starts. For example, when adjusting the headway distance while traveling on a highway, the driver desires a large deceleration rate such that the headway distance increases rapidly after coasting starts. Meanwhile, when adjusting the headway distance while traveling on a city street, the driver desires a small deceleration rate because it is difficult to adjust the headway distance with a large deceleration rate at lower vehicle speeds.

With the embodiments described above, the transmission controller 5 can achieve the different deceleration rates required by the driver at different vehicle speeds by controlling the prescribed coasting start deceleration rate (initial target deceleration rate or initial target gear ratio) such that the lower vehicle speed is, the smaller the prescribed coasting start deceleration rate is.

Additionally, since the transmission controller 5 controls the prescribed reduction rate (deceleration rate reduction rate or gear ratio reduction rate) such that the lower vehicle speed is, the smaller the reduction rate is, the amount of time from when coasting starts until the deceleration rate enters a constant speed region can be held substantially constant regardless of the vehicle speed at the time when coasting starts. As a result, the driver can grasp the dynamic deceleration characteristic readily during coasting.

Various modifications can be made without departing from the scope of the present invention. The dynamic deceleration characteristics for coasting shown in FIG. 2 can be achieved based on the target dynamic deceleration characteristic set in the embodiment shown in FIGS. 3 to 6 or based on the target dynamic gear ratio characteristic set in the embodiment shown in FIGS. 9 and 10. Additionally, it is also acceptable to achieve the dynamic deceleration characteristics based on a target engine speed of the engine or a target input rotational speed of the automatic transmission.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. An automatic transmission shift control apparatus comprising:
a deceleration operating condition detecting section that detects a vehicle coasting condition;
a first shift phase control section that control a gear ratio of an automatic transmission installed in a vehicle using a first shift phase control after detecting the vehicle coasting condition has started such that a deceleration rate of the vehicle enters a deceleration region; and
a second shift phase control section that control the gear ratio of the automatic transmission after the first shift phase control ends such that the deceleration rate of the vehicle enters a constant speed region.

2. The automatic transmission shift control apparatus as recited in claim 1, wherein
the first shift phase control section is further configured to control the gear ratio such that the deceleration rate equals a prescribed coasting start deceleration rate and thereafter reduces the deceleration rate at a prescribed reduction rate when executing the first shift phase control.

3. The automatic transmission shift control apparatus as recited in claim 2, wherein
the first shift phase control section is further configured to set the prescribed coasting start deceleration rate such that as a vehicle speed becomes lower, the coasting start deceleration rate becomes smaller.

4. The automatic transmission shift control apparatus as recited in claim 3, wherein
the first shift phase control section is further configured to set the prescribed reduction rate such that as the vehicle speed becomes lower, the reduction rate becomes smaller.

5. The automatic transmission shift control apparatus as recited in claim 2, wherein
the first shift phase control section is further configured to set the prescribed reduction rate such that as the vehicle speed becomes lower, the reduction rate becomes smaller.

6. The automatic transmission shift control apparatus as recited in claim 2, wherein
the first shift phase control section is further configured to set the prescribed coasting start deceleration rate such that as an accelerator pedal release rate becomes faster, the coasting start deceleration rate becomes larger.

7. The automatic transmission shift control apparatus as recited in claim 2, wherein
the first shift phase control section is further configured to set the prescribed coasting start deceleration rate to be larger when a brake pedal is depressed than when the brake pedal is not depressed.

8. The automatic transmission shift control apparatus as recited in claim 2, wherein
the first shift phase control section is further configured to set the coasting start deceleration rate to be smaller when the vehicle is traveling on an upwardly sloping surface than when the vehicle is traveling on a flat surface.

9. The automatic transmission shift control apparatus as recited in claim 2, wherein
the first shift phase control section is further configured to set the coasting start deceleration rate to be larger when the vehicle is traveling on a downwardly sloping than when the vehicle is traveling on a flat surface.

10. An automatic transmission shift control apparatus comprising:
- means for detecting a vehicle coasting condition;
- means for controlling a gear ratio of an automatic transmission installed in a vehicle using a first shift phase control after detecting the vehicle coasting condition has started such that a deceleration rate of the vehicle enters a deceleration region; and
- means for controlling the gear ratio of the automatic transmission after the first shift phase control ends such that the deceleration rate of the vehicle enters a constant speed region.

11. An automatic transmission shift control method comprising:
- detecting a vehicle coasting condition indicative of a vehicle coasting condition of a vehicle;
- controlling a gear ratio of an automatic transmission installed in the vehicle using a first shift phase control after detecting the vehicle coasting condition has started such that a deceleration rate of the vehicle enters a deceleration region; and
- controlling the gear ratio of the automatic transmission after the first shift phase control ends such that the deceleration rate of the vehicle enters a constant speed region.

* * * * *